March 10, 1964 N. T. MUSIAL 3,123,996
HEAT FLUX MEASURING DEVICE
Filed June 8, 1960 2 Sheets-Sheet 1
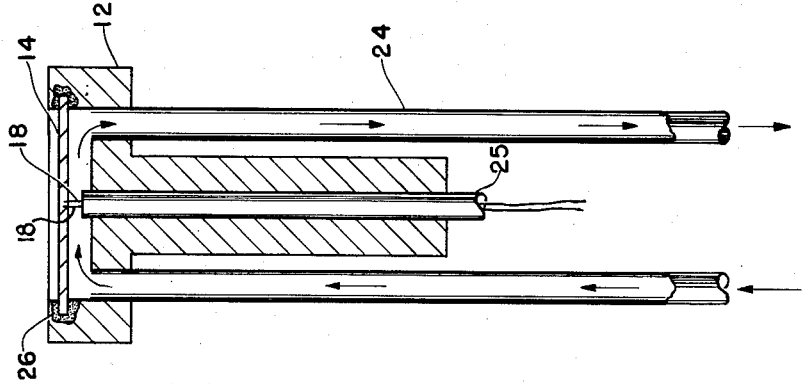
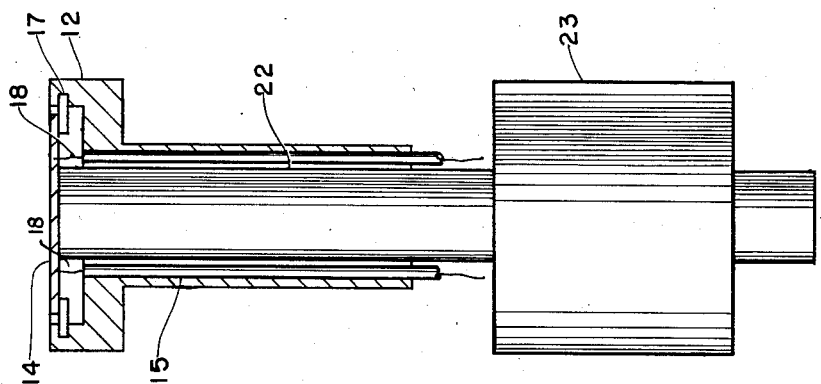
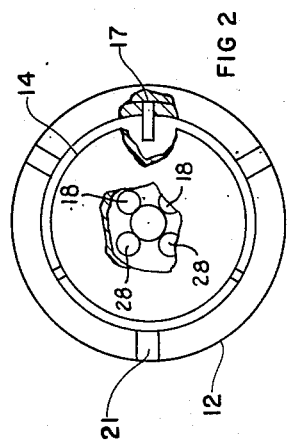
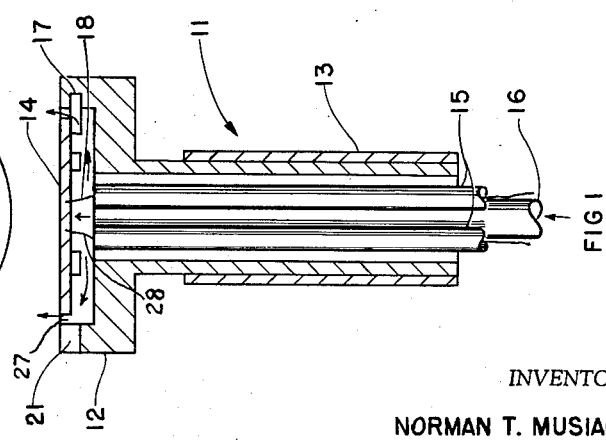
INVENTOR
NORMAN T. MUSIAL
BY 
ATTORNEY March 10, 1964 N. T. MUSIAL 3,123,996
HEAT FLUX MEASURING DEVICE
Filed June 8, 1960 2 Sheets-Sheet 2

INVENTOR
NORMAN T. MUSIAL

BY

ATTORNEY

United States Patent Office 3,123,996
Patented Mar. 10, 1964

3,123,996
HEAT FLUX MEASURING DEVICE
Norman T. Musial, 1804 Pleasantdale Drive, No. 6,
Cleveland 9, Ohio
Filed June 8, 1960, Ser. No. 34,848
6 Claims. (Cl. 73—15)
(Granted under Title 35, U.S. Code (1952), sec. 266)

The invention described herein may be manufactured and used by or for the Government of the United States of America for governmental purposes without the payment of any royalties thereon or therefor.

The purpose of this invention is to provide a device for the determination of heat flux and heat-transfer coefficients in an environment of thousands of degrees.

Primarily, heat-transfer devices utilize either the steady state, oscillatory, or transient techniques. In the steady state method the temperature drop along a rod of known thermal properties is measured. A heat sink is located at one end of the rod to absorb the heat flux. A disadvantage of this method is that it is practically impossible to eliminate heat losses away from the rod along its length. Additional disadvantage is that at high temperatures the end of the rod will melt and model destruction may result before the rod attains steady-state conditions.

In the oscillation method, a skin thermocouple and gas thermocouple is provided. A temperature oscillation such as a sine wave is imposed on the model by oscillating the heat source. The disadvantage is that it is difficult to produce an oscillation in a complex environment without changing model boundary-layer conditions. Model skin temperatures become prohibitively high when immersed in rocket gases such as the base region of an ICBM where the temperature reaches 6,000° F.; it is virtually impossible to build a gas thermocouple to withstand free stream temperatures of this nature. For example, platinum rhodium thermocouples can withstand temperatures only up to 3300° F.

The transient concept relies on the measured time rate of change of heat within the skin of a model being tested or a slug of material isolated from heat conducting surfaces through the use of an imbedded thermocouple and assumed quasi steady-state conditions. Previous to the invention, one form of the transient method involved the use of placing form-fitting shoes around the model. These shoes were then precooled by having liquid nitrogen passing through them. The shoes were then suddenly pulled away, leaving the model exposed to the higher temperatures of the free stream. This method is obviously difficult, expensive, and cumbersome to use where models are shapes other than bodies of revolution.

A second method of utilizing the transient concept is a method using a device having a disc of known physical and thermal properties. The disc is suspended from a mounting lug by pins. These pins are welded to the disc and minimize heat loss due to conduction. A thermocouple is brazed to the back of the disc which is then mounted by cementing the pins to the lug. Whereas in the cooled shoes method heat was taken away from the model, the disc method relies on the addition of heat to provide a step input. In a situation where a step change is virtually impossible, such as in the base region of a rocket model, the disc is absorbing heat before equilibrium conditions are reached. It is quite possible that the disc will overheat to destruction before equilibrium heat flux measurements can be obtained. This, of course, is undesirable in facilities where it is difficult and time-consuming to replace the disc.

This invention provides a novel device for heat flux measurements which basically consists of the previously described disc having a thermocouple attached thereto. The device of the invention utilizes the advantages of the disc method and prevents destruction due to overheating by having a means inserted in the mounting lug which is designed to convey a coolant to the disc. Additionally, the thermocouple leads are enclosed in ceramic tubes so as to prevent a second cold junction. In actual use, the disc is cooled until the surrounding environment or heat source reaches equilibrium conditions. When a measurement of heat flux is desired, the coolant flow is stopped. The hot gas, by convection and radiation, imposes a step change in temperature on the disc. When the disc temperature approaches the destruction temperature, the coolant flow is again started, thus preventing disc destruction by cooling the disc.

Thus, an object of this invention is to provide a device for the detection of heat flux.

Another object of the invention is to provide a device for the determination of heat-transfer coefficients when the environment temperature is known.

A further object of the invention is to provide a device for the determination of heat flux, which device is not subject to destruction at extreme high temperatures.

Still another object of the invention is to provide a device for the detection of heat flux at extreme high temperatures, which device is relatively small in size, thus requiring little instrumentation space.

Other objects and many attendant advantages of the present invention will be apparent from the following detailed description when taken together with the accompanying drawings in which:

FIG. 1 is a partially-sectioned pictorial view of a heat flux detecting device of the invention utilizing a single hollow coolant tube.

FIG. 2 is a partially-sectioned pictorial view of the top of the device shown in FIG. 1.

FIG. 3 is a partially-sectioned pictorial view of a heat flux detecing device of the invention utilizing a heat sink.

FIG. 4 is a partially-sectioned pictorial view of a heat flux measuring device of the invention utilizing two hollow coolant tubes.

Figure 7:
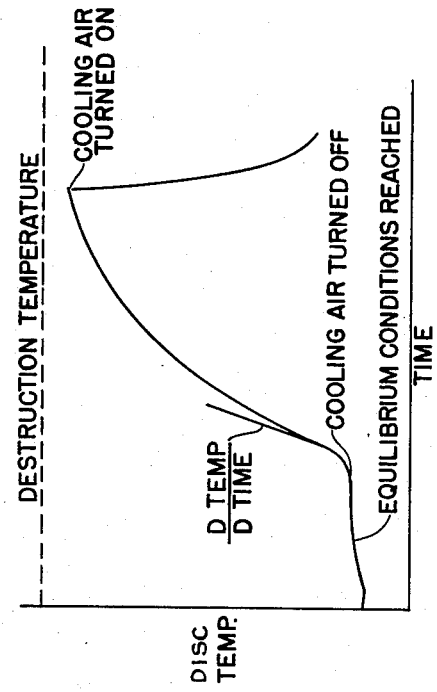
FIG. 7 is a graph of temperature versus time where a cooled disc heat flux detecting device is used.

Referring now to the drawings, wherein like reference characters designate like or corresponding parts throughout the several views, there is shown in FIGS. 1 and 2 the heat flux detecting device 11 having a detecting element 14 shaped as a disc which is made of any heat conductive material such as copper, Inconel, nickel, gold, stainless steel, and many other such materials and suspended and isolated from the mounting lug 12 by pins 17 forming thereby an annulus 27. The pins are attached by any conventional means to the back of said disc 14. Three pins are shown by way of example in the figures. The pins 17 are placed in openings 21 provided in the mounting lug 12 and the pins and disc are revolved in a slot undercut in the mounting lug to a position as shown in FIG. 2. Surrounding the neck of the T-shaped mounting lug 12 is a mounting stud 13 which is not necessary in all applications. Fitted concentrically within the mounting lug is a tube 16 which serves to convey a coolant which may be, air, water, or any other suitable gas or liquid to the disc. The coolant cools the disc by impinging on the back thereof, thereby absorbing heat and escapes through the annulus 27 into the environment wherein the device 11 is positioned. As seen in FIGS. 1 and 2, two pairs of thermocouple wires 18 and 28 may be used forming thereby two thermocouples, each wire being encased by a ceramic tube 15. These wires, as clearly shown in FIG. 1, are imbedded or peened into the back of the disc 14. Since the aforementioned materials to be used for fabrication of the disc are by their very nature electrical conductors, electrical continuity between paired thermocouple wires is accomplished, thereby forming thermocouples even though the conventional bead which is formed by joining the thermocouple wires at the ends thereof is not present. Two thermocouple wires, forming thereby one thermocouple, are also found to be satisfactory and in actual practice any quantity of thermocouple wires that is a multiple of two would suffice. A temperature-time data point is taken with the heat flux detecting device 11, as described with reference to FIG. 4.

Referring now to FIG. 3, there is shown the disc 14 having the pins 17 attached thereto, the pins being attached to the mounting lug 12 in the same manner as described above. The thermocouple wires 18 are encased by ceramic tubes 15 situated within the mounting lug 12. A rod 22 made of a material of high thermal conductivity such as copper is shown situated concentrically within the mounting lug 12 and having one end thereof in contact with the disc 14. Surrounding a portion of the rod is a jacket 23 which acts as a heat sink and contains liquid gas such as nitrogen or air. If it is necessary that no coolant be discharged into the region where heat flux measurements are to be taken, the device shown in FIG. 3 may be used. The pre-equilibrium heat input which will be hereafter explained is removed by means of conduction through the rod 22 of high thermal conductivity into the heat sink jacket 23. When a temperature-time data point is to be taken the rod 22 is suddenly pulled away from the disc by any conventional mechanical device (not shown). To prevent the destruction of the device, the rod is brought into contact by the same device (not shown) with the disc after the disc temperature-time reading is taken and before the destruction temperature is reached.

Referring now to FIG. 4, there is shown another embodiment wherein coolant flow is not discharged into the environment. As indicated the disc 14 is permanently embedded in the mounting lug 12. The disc 14 may be peripherally embedded in cement 26, as shown, or other similar material so as to permanently fix and seal its position in relation to the lug 12. Two hollow tubes 24 are provided to carry the coolant to and away from the disc 14. A hollow ceramic tube 25 is situated along the center axis of the mounting lug 12 and serves to contain the thermocouple wires 18. This device is particularly useful where it is important that no coolant escape into the region where heat flux measurements are to be taken. When a temperature-time data point of the disc is to be taken, the coolant is suddenly stopped from flowing by any conventional valve arrangement (not shown) disposed in the tubes 24 and then to prevent the destruction of the disc the coolant is started again after the point is taken.

Figure 5:
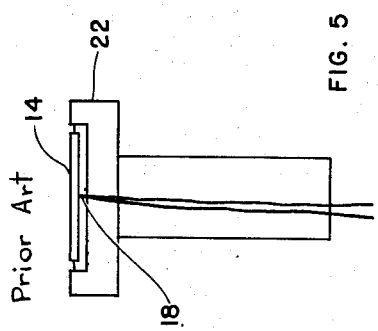
FIG. 5 is a schematic view of a prior art disc heat flux measuring device wherein no means is provided for cooling the disc.

Referring now to FIG. 5, there is shown a schematic view of a prior art heat flux detecting device where no means are provided for cooling the disc 14. As seen in this figure, thermocouple wires 18 are provided and a mounting lug 22 contains the disc and thermocouple wires.

An application of and utilization of the embodiments discussed above will now be explained. The thermocouple wires are connected, as well known to one skilled in the art, to a conventional E.M.F. detecting instrument through a cold junction, thereby providing a reference temperature and which, for most purposes, is a quantity of ice water. The E.M.F. detecting instrument is preferably one that provides visual traces of the thermocouple E.M.F. output, such as for example, the Visicorder manufactured by Minneapolis Honeywell—Heiland Division. The detecting device, as an example, may be positioned in the base region of a clustered rocket configuration such as the "Polaris" missile. Since the rocket engines thereof do not respond to ignition in a first order manner, there is a time period involved before the engines reach full chamber pressure equilibrium condition, during which time period heat loads are being imposed on the disc.

Figure 6:
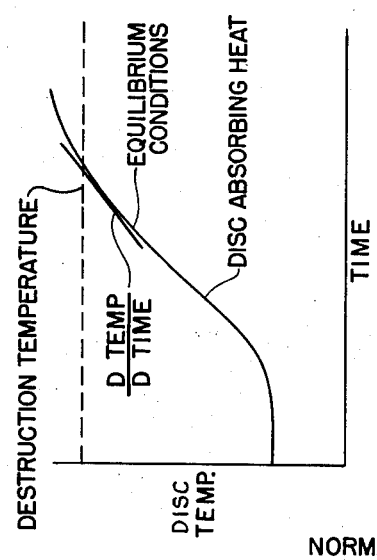
FIG. 6 is a graph of temperature versus time when an uncooled disc heat flux detecting device is used.

Referring now to FIG. 6, there is plotted the detecting element curve of temperature versus time as visually portrayed on the Visicorder trace when the prior art uncooled device such as shown in FIG. 5 is used in the aforementioned Polaris base region. The heat flux is determined from the equation:

$$Q = (\rho C_p b)_{disc} \frac{d \text{ temp.}}{d \text{ time}}$$

where:

$Q$ = B.t.u./ft.$^2$ sec. = heat flux
$\rho$ = skin density, lbs./ft.$^3$
$C_p$ = skin specific heat, B.t.u./lb. °F.
$b$ = skin thickness, ft.

$\frac{d \text{ temp.}}{d \text{ time}}$ = slope of curve at chamber pressure equilibrium condition determined from plot of disc temperature vs. time As can be seen in FIG. 6, after the equilibrium conditions are reached so that the evaluation of heat flux using the above-mentioned equation via the $$\frac{d \text{ Temp.}}{d \text{ Time}}$$

slope can be measured, the temperature of the disc will continue rising past its destruction temperature. It is even quite possible that the temperature of the disc will exceed its destruction temperature before equilibrium conditions are established. In tests the equilibrium temperature conditions may exceed the destruction temperature, such as shown in the graph. Even if one were to immediately remove the disc from the area of measurement after the reading was taken, it can be seen that the destruction temperature could still possibly be reached and the disc destroyed. In any event, when not using the coolant, the heat flux detecting device would have to be removed, either to prevent the disc from being destroyed or replace the destroyed disc.

Referring now to FIG. 7, a graph similar to that seen in FIG. 6 is shown wherein the response of a cooled heat flux detecting device is positioned in the aforementioned Polaris base region. As can be seen, the coolant flow maintains the disc at a relatively low temperature. After an equilibrium chamber pressure environment condition is obtained the cooling, be it done by fluid convection, as shown in FIG. 1 and FIG. 4 or rod position, as shown in FIG. 3 is turned off, thereby enabling the disc 14 to increase in temperature with time because the surrounding gases are at a higher temperature. A slope of $$\frac{d \text{ Temp.}}{d \text{ Time}}$$

from the disc temperature-time curve may then be used in the aforementioned equation equal to compute heat flux. The cooling fluid or rod movement coolant may be initiated just prior to when the temperature of the disc reaches the destruction point.

It is pointed out that the disc used in the device may be attached to the mounting lug by means of cement such as that shown in FIG. 4, in all the various embodiments of the invention, and that other means may be used for attaching the disc to the lug other than as specifically shown. Additionally, it is pointed out that the detecting element is not limited to the use of a disc. Practically any geometric shape may be used as long as the physical and thermal properties of its material of construction is known.

Obviously, many modifications and variations of the present invention are possible in the light of the above teachings. It is, therefore, to be understood that within the scope of the appended claims the invention may be practiced other than as specifically described.

What is claimed is:

1. A heat flux detecting device comprising in combination,
   first means having high thermal conductivity for absorbing environmental heat loads,
   means to support said first means in an extremely hot environment having an elevated temperature above the destruction temperature of said first means,
   means for thermally isolating said first means from said support means,
   a plurality of thermocouple wires for connecting an E.M.F. detecting instrument through a cold junction to said first means forming thereby thermocouple means, and
   means for directing a coolant to said first means and maintaining the same below the destruction temperature thereof while selectively enabling said instrument to detect changes in the E.M.F. output of said thermocouple means while said cooling is stopped for a time interval.

2. The heat flux detecting device set forth in claim 1 wherein tubes of heat protective material encase said plurality of thermocouple wires.

3. The heat flux detecting device in claim 1 wherein said first means comprises a disc, and
   said coolant directing means is comprised of a heat sink in selective communication with said disc by a solid rod having high thermal conductivity.

4. The heat flux detecting device in claim 1 wherein said support means comprises a hollow mounting lug, and
   said coolant directing means is comprised of a tube mounted concentrically within said mounting lug thereby effecting impingement of coolant flow exiting from said tube on said first means.

5. The heat flux detecting device of claim 1 wherein said coolant directing means is comprised of two tubes situated adjacent said support means whereby the coolant is directed to said first means by one tube and is carried away from said first means by the second tube.

6. In apparatus for determining heat flux and heat-transfer coefficients of the type having a heat conductive member positioned in an extremely hot environment having an elevated temperature above the destruction temperature of said member and pairs of thermocouple wires for connecting said member to an E.M.F. detecting instrument, the improvement comprising
   means for cooling said member to prevent destruction thereof when said environment has an extremely high temperature, and
   means for interrupting said cooling for a predetermined time interval wherein said instrument detects changes in the E.M.F. output of said thermocouple wires.

References Cited in the file of this patent

UNITED STATES PATENTS

| | | |
|---|---|---|
| 2,431,473 | Flynn | Nov. 25, 1947 |
| 2,475,138 | Hood et al. | July 5, 1949 |

OTHER REFERENCES

"Apparatus for Measuring Thermal Conductivity of Metals up to 600° C.," by Van Dusen et al., Bureau of Standards Journal of Research, vol. 12, pp. 429–440, April 1934.

"Apparatus for Measuring the Thermal Conductivity of Metals in Vacuum at High Temperatures," by Marvin Moss, The Review of Scientific Instruments, volume 26, No. 3, pp. 276–79, March 1955.